(12) United States Patent
Wang

(10) Patent No.: US 8,601,646 B2
(45) Date of Patent: Dec. 10, 2013

(54) STEEL WIRE HOOK

(76) Inventor: Zhangjian Wang, Shanghai (CN)

(*) Notice: Subject to any disclaimer, the term of this patent is extended or adjusted under 35 U.S.C. 154(b) by 138 days.

(21) Appl. No.: 13/244,478

(22) Filed: Sep. 25, 2011

(65) Prior Publication Data

US 2013/0036578 A1    Feb. 14, 2013

(30) Foreign Application Priority Data

Aug. 12, 2011  (CN) .......................... 2011 1 0231176

(51) Int. Cl.
*F16B 1/00*    (2006.01)
(52) U.S. Cl.
USPC ............... 24/296; 24/458; 277/630; 49/492.1
(58) Field of Classification Search
USPC ............. 24/296, 458, 581.11, 570; 49/492.1; 52/718.07; 277/630, 637, 640
See application file for complete search history.

(56) References Cited

U.S. PATENT DOCUMENTS

| | | | | |
|---|---|---|---|---|
| 1,942,119 A * | 1/1934 | Place | ............................. | 29/91.1 |
| 1,948,462 A * | 2/1934 | Le Page | ...................... | 24/581.11 |
| 2,163,455 A * | 6/1939 | Van Uum | ........................ | 24/453 |
| 2,197,590 A * | 4/1940 | Place | ............................. | 24/296 |
| 2,215,428 A * | 9/1940 | Place | ............................. | 24/296 |
| 2,254,310 A * | 9/1941 | Place | ........................ | 52/718.07 |
| 2,389,635 A * | 11/1945 | Place | ............................ | 411/530 |
| 2,406,665 A * | 8/1946 | Churchill | ........................ | 24/458 |
| 2,643,433 A * | 6/1953 | Scott | ............................. | 24/296 |
| 2,822,593 A * | 2/1958 | Sponsel | ........................ | 24/67.9 |
| 3,160,251 A * | 12/1964 | La Penna et al. | .......... | 52/718.07 |
| 3,167,824 A * | 2/1965 | Berwanger | .................. | 49/482.1 |
| 3,251,105 A * | 5/1966 | La Penna | ........................ | 24/296 |
| 4,822,060 A * | 4/1989 | Moyer et al. | .................. | 277/640 |
| 5,107,623 A * | 4/1992 | Weil | .............................. | 277/637 |
| 5,205,075 A * | 4/1993 | Moyer | ......................... | 49/493.1 |
| 5,289,658 A * | 3/1994 | Lusen et al. | ................ | 49/492.1 |
| 5,341,601 A * | 8/1994 | Moyer | ......................... | 49/493.1 |
| 5,806,149 A * | 9/1998 | Schultz et al. | ................. | 24/296 |
| 5,918,885 A * | 7/1999 | Radke, II | ...................... | 277/630 |
| 6,533,289 B2 * | 3/2003 | Bono et al. | .................... | 277/630 |
| 6,893,025 B2 * | 5/2005 | Hight et al. | ................... | 277/630 |
| 7,093,838 B2 * | 8/2006 | Hight et al. | ................... | 277/630 |
| 7,124,540 B2 * | 10/2006 | Qiang | ......................... | 49/492.1 |
| 7,464,461 B2 * | 12/2008 | Hight et al. | ................... | 29/889.3 |
| 8,214,974 B2 * | 7/2012 | Zhou et al. | ..................... | 24/458 |
| 2004/0094905 A1 * | 5/2004 | Weil | .............................. | 277/628 |
| 2005/0198909 A1 * | 9/2005 | Qiang | ......................... | 49/492.1 |
| 2009/0079141 A1 * | 3/2009 | Qiang et al. | ................. | 277/650 |
| 2009/0144949 A1 * | 6/2009 | Zhou et al. | ..................... | 24/458 |

* cited by examiner

*Primary Examiner* — Robert J Sandy
*Assistant Examiner* — Rowland D Do

(57) ABSTRACT

A steel wire hook includes a head and a base which are made of metallic wire. The head is connected with the base. A plane where the head is provided is perpendicular to a plane where the base is provided. The head includes a circular-arc-shaped top end portion, a left shoulder, a right shoulder and a short leg. The left shoulder and the right shoulder are extended from the circular-arc-shaped top end portion and are symmetrical to each other. The short leg is provided at a lower end of the head and is tilted towards the circular-arc-shaped top end portion. An angle is provided between the short leg and the base. The base, having an approximately oval-shape and formed by coiling a metallic wire at a horizontal direction, includes a long leg which has a larger gap from the main body of the base.

8 Claims, 2 Drawing Sheets

STEEL WIRE HOOK

BACKGROUND OF THE PRESENT INVENTION

1. Field of Invention

The present invention relates to a steel wire hook for fastening a gasket, a sealing element or the like on an installation plane, which is generally used on the sealing element of the door of the oven, refrigerator, microwave oven and some heating equipments.

2. Description of Related Arts

There are the tubular gaskets at the peripheral edge of the door of the oven, refrigerator, microwave oven and some heating equipments. These gaskets mainly act as the sealing members, and also the other members. These gaskets consist of the framework which is woven by the metallic wire and has good flexibility and the outer casing which is woven by the insulating materials. It has been proved that this structure can be applied in the continuous high-temperature self-cleaning oven, and simultaneously, the gasket can provide good sealing performance in spite that the oven door is repeatedly switched-on/off for many years.

In generally, this tubular gasket is installed to the door of the heating equipment by the independent hook for connecting the gasket with the door. The hook consists of the head and the base which is perpendicular to the head. The base of the hook is woven or inserted into the gasket, and the head of the hook is inserted into the installation hole of the door of the oven, thereby installing the gasket onto the door of the oven.

U.S. Pat. No. 5,107,623 provides a solution. However, after installing the hook into the gasket, it is difficult to take off the hook without any damage to the gasket. If the hook is forcibly taken off, the casing woven by the insulating materials and provided outside the gasket will be damaged, and the sealing performance of the gasket will be seriously affected. In this solution, the hook only can be installed into the gasket by the machine while weaving the glass fiber. During the weaving process, once a hook has the problem, the whole gasket is useless. Furthermore, no intersection or connecting point exists between the framework with the good flexibility and the other elements, so the framework is inclinable to slide out of the outer casing or displace relative to the outer casing. Therefore, while adopting this solution, two ends of the whole gasket must be fastened by another member.

U.S. Pat. No. 7,124,540 provides another solution. While installing the hook with the elliptic bottom and a short tail to the gasket, it is prone to adhere the tail to the exterior wall of the gasket, which causes the whole gasket to be depressed at a position where the hook is located, so that the sealing performance is affected. The effect is fatal to seal the heat chamber of the heating device. Also, due to the tail, while installing the gasket to the oven door, it is possible for the operator to be injured by the tilting tail. Furthermore, it is difficult for the hook provided by this solution to be directly inserted into the gasket while weaving the gasket.

Furthermore, in the solution provided by the U.S. Patent No. 2009/0144949, the base is circular. The base has one or more protuberances. The plane where the protuberances are provided is parallel to the plane where the head portion of the hook is provided. The head portion of the hook provided by this solution can rotate along the axis of the neck and the top portion after installing the hook into the gasket, which will bring great puzzle to the operator. Also, in the solution, while the hook is installed to the installing plane, the tail end of the wire of the base is extruded to be tilted, so the probability that the operator is injured by the tail end of the wire of the base can not be avoided during the actual installation process. In addition, in the solution, the base of the hook is circular, after the gasket is installed to the installation plane, the diameter of the base of the hook has a transverse extrusion to the gasket, so that the cross section of the gasket turns to be an irregular shape, which will directly result in the invalidation of the sealing of the heat chamber of the heating appliance.

In the U.S. Patent No. 2008/0256793 A1, the base of the hook is processed to be spirality. The base of the hook, having an approximately thread-shape, is formed by twisting the wire for 2-3 circles. Furthermore, the base has a tail portion extended along the circumferential direction or towards the center of the base and tilted. The metallic wires of the base are close to each other and no gap among the wires is provided, so that while installing the hook to the gasket, the outer casing of the gasket is inclinable to be damaged, which will lead to the invalidation of the sealing performance of the heat chamber of the heating appliance. In addition, the hand of the operator is easily injured by the tilted tail.

SUMMARY OF THE PRESENT INVENTION

An object of the present invention is to provide a steel wire hook which is capable of effectively preventing the operator from being injured by the tail end of the hook during the installation.

Another object of the present invention is to provide a steel wire hook which is capable of avoiding the invalidation of the sealing performance of the gasket caused by the adhesion of the tail end of the hook and the gasket.

Accordingly, in order to accomplish the above objects, the present invention provides a steel wire hook, comprising:

a head made of metallic wire, comprising a circular-arc-shaped top end portion, a left shoulder, a right shoulder and a first leg, wherein the left shoulder and the right shoulder are extended from the circular-arc-shaped top end portion and are symmetrical to each other, the first leg is provided at a lower end of the head and is tilted towards the circular-arc-shaped top end portion; and a base made of metallic wire, connected with the head and having a ring-shape formed by coiling a metallic wire at a horizontal direction, comprising a main body and a second leg comprising a leg body extended from the main body and an end portion spaced from the main body, wherein a plane where the head is provided is perpendicular to a plane where the base is provided, an angle is provided between the first leg and the base, and an angle is provided between the end portion and the leg body of the second leg.

Therefore, according to the steel wire hook of the present invention, the gasket can be firmly and effectively fastened to the installing surface by the flat base and the short leg tilted towards the top end portion. After installing the hook, the base of the hook and the framework of the gasket are at a same plane, and the end portion bent downwardly from the plane where the base of the hook is provided is inserted into a half of the thickness of the framework of the gasket, which not only effectively prevents the operator from being injured by the tail end of the hook during the installation, but also avoids the invalidation of the sealing performance of the gasket caused by the adhesion of the tail end of the hook and the gasket. The steel wire hook of the present invention effectively resolves the rotation of the head of the hook and the axial displacement between the inner and outer layers of the gasket. Furthermore, the steel wire hook of the present invention resolves the problem that the mechanical installation and manual installation can not be achieved at the same model hook.

DETAILED DESCRIPTION OF THE PREFERRED EMBODIMENT

The present invention is further explained in detail with the accompanying drawings.

Figure 1:
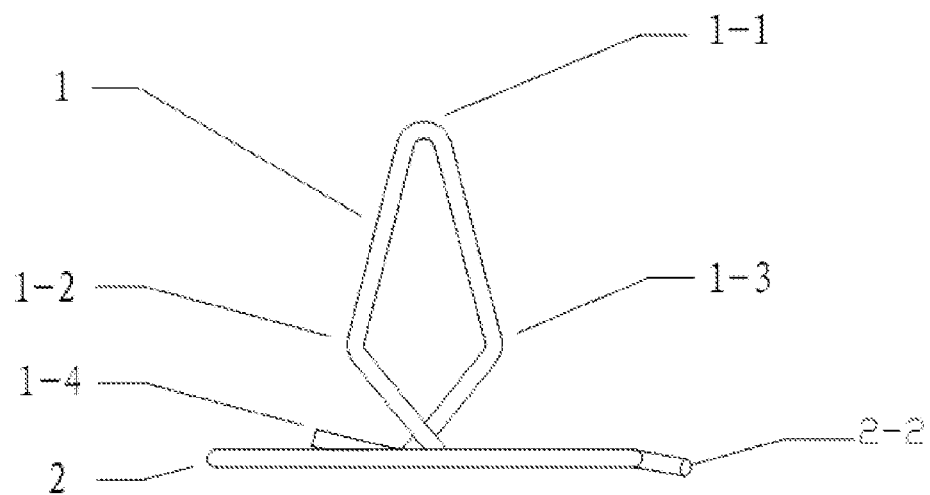
FIG. 1 is a front view of a steel wire hook according to a preferred embodiment of the present invention.
Figure 2:
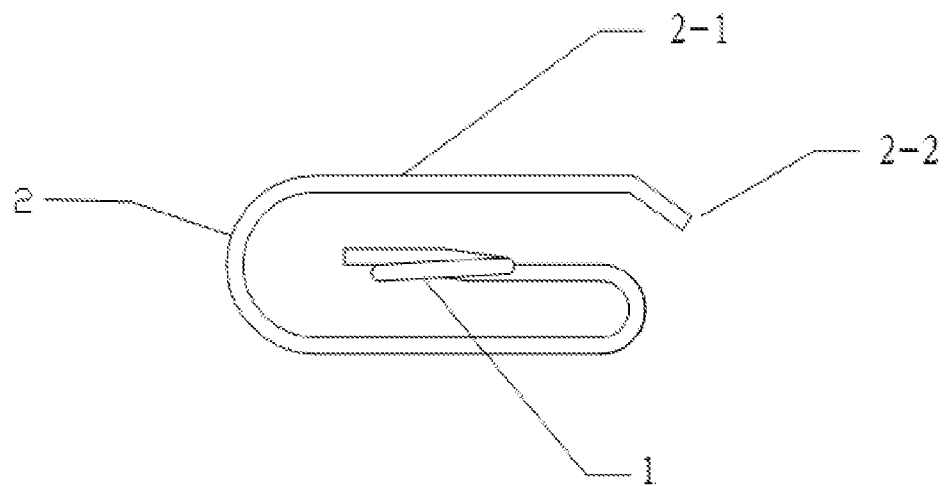
FIG. 2 is a top view of FIG. 1.

Referring to FIGS. 1 and 2 of the drawings, a steel wire hook according to a preferred embodiment of the present invention is illustrated, wherein the steel wire hook comprises a head 1 and a base 2 which are made of metallic wire. The head 1 is connected with the base 2. The plane where the head 1 is provided is perpendicular to the plane where the base 2 is provided. The head 1 comprises a circular-arc-shaped top end portion 1-1, a left shoulder 1-2, a right shoulder 1-3 and a short leg 1-4, wherein the left shoulder 1-2 and the right shoulder 1-3 are extended from the circular-arc-shaped top end portion 1-1 and are symmetrical to each other, the short leg 1-4 is provided at a lower end of the head 1, an angle is provided between the short leg 1-4 and the base 2, and the short leg 1-4 is tilted towards the circular-arc-shaped top end portion 1-1. The base 2 has an approximately oval-shape and is formed by coiling the metallic wire at the horizontal direction. The base 2 comprises a long leg 2-1 having a leg body and an end portion 2-2. The end portion 2-2 of the long leg 2-1 bends downwardly from the plane where the bottom surface of the hook is provided and along the plane where the head of the hook is provided. A larger gap is provided between the end portion 2-2 of the long leg 2-1 and the main body of the base 2.

When the steel wire hook passes through the inner and outer layers of the gasket to be installed within the gasket, due to the approximately oval-shaped base, a large enough support force is provided for the gasket. Simultaneously, the deformation of the gasket is decreased to the minimum, thereby ensuring the sealing performance of the gasket.

When the steel wire hook passes through the inner and outer layers of the gasket to be installed within the gasket, due to the short leg 1-4 tilted towards the circular-arc-shaped top end portion 1-1, the short leg 1-4 is inserted between the inner layer and the outer layer of the gasket during the installation. Therefore, the gasket is provided with not only the binding force for well positioning the inner and outer layers of the gasket to avoid the displacement therebetween, but also the supporting force for tightly attaching the gasket to the door while installing the gasket onto the door. Furthermore, the head is effectively avoided being pressed into the gasket while installing the hook.

Figure 3:
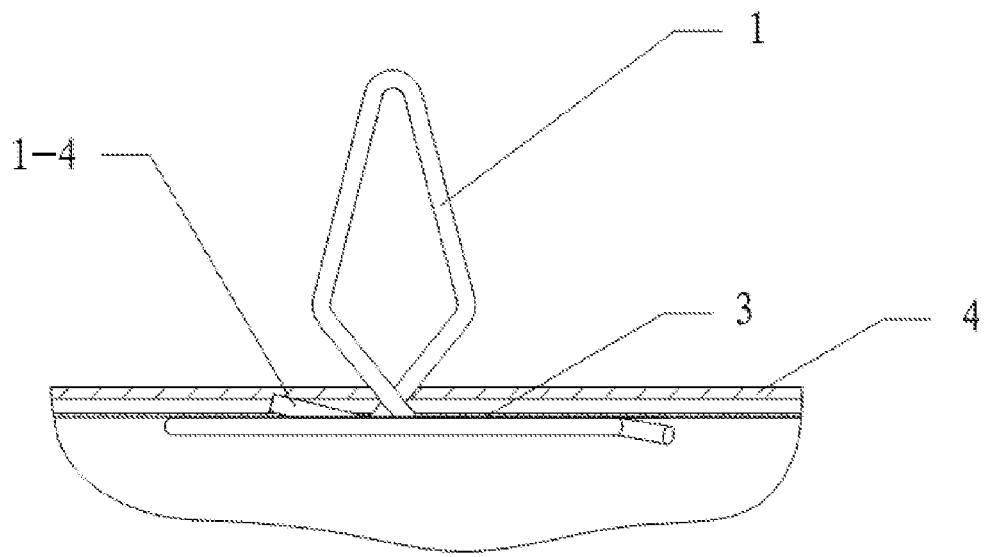
FIG. 3 is an installation diagram showing that the steel wire hook is installed into a gasket (which can be achieved by both the manual implantation method and the automatically mechanical implantation method).

Referring to FIG. 3, the short leg 1-4 of the steel wire hook is inserted between the fiberglass pipe 4 and the network pipe 3 for positioning and avoiding the circumrotation after the installation of the steel wire hook. The leg body of the long leg 2-1 of the steel wire hook and the bottom surface of the steel wire hook are at the same plane. A smaller angle is provided between the end portion 2-2 and the leg body of the long leg. A height of the end portion 2-2 is a half of that of the framework of the gasket for effectively avoiding the adhesion of the steel wire hook, the network pipe 3 and the fiberglass pipe 4, and completely eliminating the hidden trouble on the hand while installing the product. The end portion of the long leg 2-1 has a long distance away from the main body of the steel wire hook for conveniently and quickly installing the steel wire hook. An end of the long leg 2-1 is bent for avoiding protruding from the fiberglass pipe 4 after installing the steel wire hook.

Figure 4:
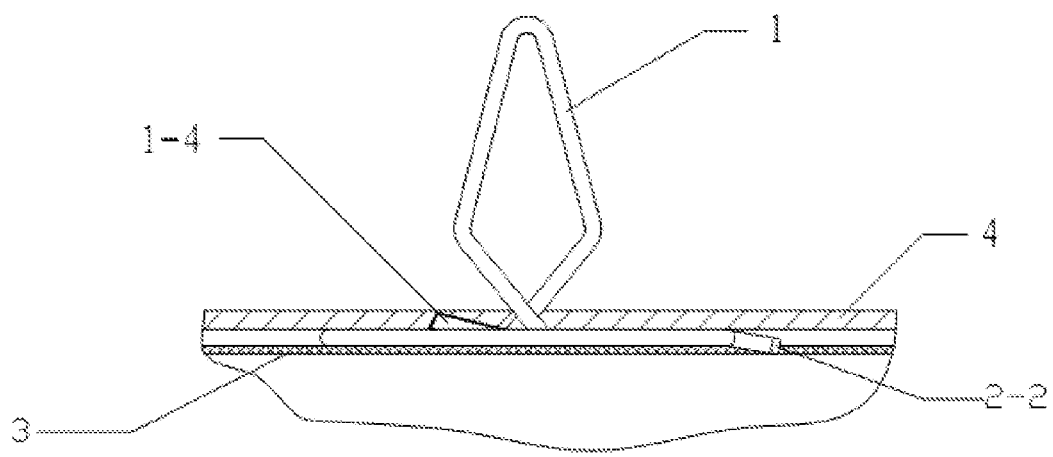
FIG. 4 is another installation diagram showing that the steel wire hook is installed into a gasket (which can be achieved by the automatically mechanical implantation method).

FIG. 4 shows that the hook is automatically embedded by the machine. While automatically embedding the hook by the machine, the short leg 1-4 of the steel wire hook is directly inserted into the fiberglass layer 4 for positioning. An angle is provided between the end portion 2-2 and the leg body of the long leg, so while the hook is implanted into the gasket, the end portion 2-2 is inserted into the framework of the gasket for well positioning to effectively avoid the axial displacement of the fiberglass pipe and the network pipe.

The steel wire hook of the present invention has the variety of shapes and types. The specific structures and shapes are not limited to those mentioned above. For example, the base of the hook can be the diamond-shape or other irregular shapes. Also, the base can be made into other geometries which have the small warping angle. Furthermore, the short leg can be made into the circular arc shape or other geometric shapes.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hook, comprising:

a head and a base formed from a metallic wire;

said head comprising a circular-arc-shaped top end portion, a left shoulder, a right shoulder and a first leg, wherein said left shoulder and said right shoulder are extended from said circular-arc-shaped top end portion and are symmetrical to each other, said first leg is provided at a lower end of said head and inclined towards said circular-arc-shaped top end portion extending from one of said left shoulder and said right shoulder, said head provided in a vertical plane;

said base connected with said head, said base provided in a horizontal plane and being perpendicular to said vertical plane provided of said head where said head extends vertically upward from said horizontal plane, said base having a ring-shape formed by coiling the metallic wire in said horizontal plane, said base comprising a main body and a second leg comprising a leg body extended from said main body and an end portion spaced from said main body with a determined distance and curvedly extended from said leg body; and wherein an angle is provided between said first leg and said base, said end portion of said second leg is simultaneously bent downwardly from said horizontal plane where said base of said hook is provided and towards said vertical plane where said head of said hook is provided.

2. The hook, as recited in claim 1, wherein said leg body of said second leg and said main body of said base are in a same plane.

3. The hook, as recited in claim 2, wherein said base has an approximately oval-shape.

4. The hook, as recited in claim 3, wherein said first leg has a circular-arc-shape.

5. The hook, as recited in claim 2, wherein said first leg has a circular-arc-shape.

6. The hook, as recited in claim 1, wherein said base has an approximately oval-shape.

7. The hook, as recited in claim 6, wherein said first leg has a circular-arc-shape.

8. The hook, as recited in claim 1, wherein said first leg has a circular-arc-shape.

* * * * *